United States Patent [19]
Vogt et al.

[11] Patent Number: 5,796,861
[45] Date of Patent: Aug. 18, 1998

[54] MOSAIC CONSTRUCTION, PROCESSING, AND REVIEW OF VERY LARGE ELECTRONIC MICROGRAPH COMPOSITES

[75] Inventors: Robert C. Vogt, Ann Arbor; John M. Trenkle, Ypsilanti, both of Mich.

[73] Assignee: Frim International, Inc., Ann Arbor, Mich.

[21] Appl. No.: 893,889

[22] Filed: Jul. 11, 1997

Related U.S. Application Data

[60] Provisional application No. 60/021,251, Jul. 12, 1996.

[51] Int. Cl.⁶ ................................................. G06K 9/00
[52] U.S. Cl. ............................................ 382/128; 382/284
[58] Field of Search ............................... 382/128, 133, 382/256, 257, 284, 308; 128/922

[56] References Cited

U.S. PATENT DOCUMENTS

| | | | |
|---|---|---|---|
| 4,761,075 | 8/1988 | Matsushita et al. | 356/39 |
| 5,072,382 | 12/1991 | Kamentsky | 364/413.08 |
| 5,187,754 | 2/1993 | Currin et al. | 382/54 |
| 5,231,580 | 7/1993 | Cheung et al. | 364/413.13 |
| 5,287,272 | 2/1994 | Rutenberg et al. | 364/413.01 |

OTHER PUBLICATIONS

F. Marques et al. "Morphological Scheme for Myelinated Nerve Fiber Morphometric Analysis," pp. 122–126, (no date).

J. Serra, P. Salembier, "Mathematical Morphology and its Applications to Signal Processing," May 1993 (no translation available).

Preston, Jr. et al., "Basics of Cellular Logic with Some Applications in Medical Image Processing," *Proceedings of the IEEE*, May 1979, vol. 67, No. 5, pp. 826–855.

Engel et al., "Digital Acquisition and Processing of Electron Micrographs Using a Scanning Transmission Electron Microscope," *Ultramicroscopy*, 1981, vol. 7, No. 1, pp. 45–54.

Li et al., "A Pyramidal Approach for the Recognition of Neurons Using Key Features," *Pattern Recognition*, 1986, vol. 19, No. 1, pp. 55–62.

*Primary Examiner*—Andrew W. Johns
*Attorney, Agent, or Firm*—Gifford, Krass, Groh, Sprinkle, Patmore, Anderson & Citkowski

[57] ABSTRACT

A method is described for acquisition, mosaicking, cueing and interactive review of large-scale transmission electron micrograph composite images. Individual frames are automatically registered and mosaiced together into a single virtual image composite, which is then used to perform automatic cueing of axons and axon clusters, as well as review and marking by qualified neuroanatomists. Statistics derived from the review process were used to evaluate the efficacy of the drug in promoting regeneration of myelinated nerve fibers.

11 Claims, 5 Drawing Sheets

MOSAIC CONSTRUCTION, PROCESSING, AND REVIEW OF VERY LARGE ELECTRONIC MICROGRAPH COMPOSITES

REFERENCE TO RELATED APPLICATION

This application claims priority of U.S. provisional application Ser. No. 60/021,251, filed Jul. 12, 1996.

FIELD OF THE INVENTION

The present invention relates generally to the processing and interpretation of images at high magnification and, in particular, the invention makes it possible to capture and mosaic such images into a single, very large composite, and further provides tools associated with composite review.

BACKGROUND OF THE INVENTION

As is well-known, diabetes is a progressive disease, with many side effects, including loss of vision, kidney damage, and the loss of sensation in the extremities due to peripheral nerve damage, especially for myelinated nerve fibers. This loss of peripheral nerve function can eventually lead to cell death, gangrene, and the loss of toes or feet. A number of drugs are now under study to attempt to reduce or reverse this peripheral nerve loss, by triggering regeneration of atrophied nerve cells.

This invention concerns the assessment of a drug's ability to produce anatomical nerve changes consistent with the desired nerve regeneration effect, and consistent with clinical evaluations of nerve function in the same patients. The particular anatomical changes considered here include an increase in the percentage or area density of regenerative axon clusters, or an increase in the area density of the axon fibers themselves, particularly the smaller ones (less than 5–6 microns in diameter).

Figure 1:
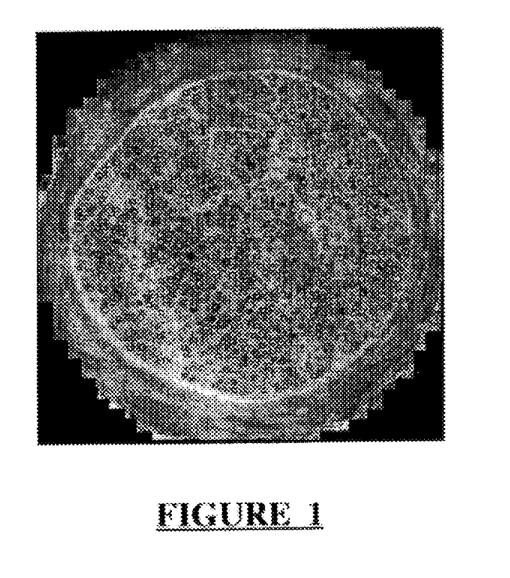
FIG. 1 illustrates a composite image of a nerve fascicle.

To make this assessment, a trained neuroanatomist reader is required to review the entire cross-sectional area of complete nerve fiber bundles, or fascicles. FIG. 1 represents a low-resolution cross-section through one of the nerve fascicles, of which there would typically be around 5 or 6 in any given nerve section. First, the reader is required to identify all of the axon fibers (donut-like objects) in the fascicle, which could number as high as 1000–2000. Second, the reader must identify all of the regenerative clusters, which are groups of two or more small axons that are completely surrounded by a single basement membrane. These clusters are considered to provide direct anatomical evidence of nerve regeneration, and thus are critical to definitively demonstrating the utility of the drug for diabetic patients. Unfortunately, such clusters are also relatively rare, and difficult to verify, due to the narrow width of the basement membrane which surrounds them.

The use of cluster counting to measure nerve regeneration is a relatively new development, and up to now, very few studies have been performed based on this technique. The main difficulty in taking this approach is the sheer volume of data necessary to collect and review. In the past, small studies of this type were carried out using film-based electron micrograph systems. The films were taken, developed, and then literally pasted together manually to form a gigantic image, a few yards across, which would be reviewed by an anatomist using a magnifying glass, for counting axons and identifying clusters.

SUMMARY OF THE INVENTION

The present invention facilitates a higher throughput acquisition and review of high-magnification composite imagery of the type used in neuroanatomical studies by providing an entirely digital acquisition and processing system and accompanying method. Images are acquired using a digital camera connected to an electron microscope (EM) including an automatically controlled stage so that all of the 1000 or more frames for a given sample may be acquired without human intervention. Pre-processing, registration, and mosaicking of the raw EM image frames are then carried out using an entirely automated process, as is the ultimate cueing of the axons and potential clusters.

Upon the taking of an appropriate nerve biopsy, a number of sample preparations steps are preferably undertaken prior to the time that the sample is imaged. Following such preparation, the sample is automatically imaged on the electron microscope, and the data files were transferred to another computer for the pre-processing, registration, and mosaicking steps.

When the composite, or "virtual" image product is complete, the data are transferred to a third computer station where automatic axon and cluster cueing are performed. A number of morphological operations are used to assist in estimating the number of axons, clusters, and fibers within the composite image. The outputs from this process, along with the composite image data, were then sent to a sample reviewing station, where a neuroanatomist reader would examine the sample, and mark axons and regenerative clusters. These marks formed the basis of the statistics that were analyzed to evaluate the efficacy of the drug.

DETAILED DESCRIPTION OF THE PREFERRED EMBODIMENT

Figure 2:
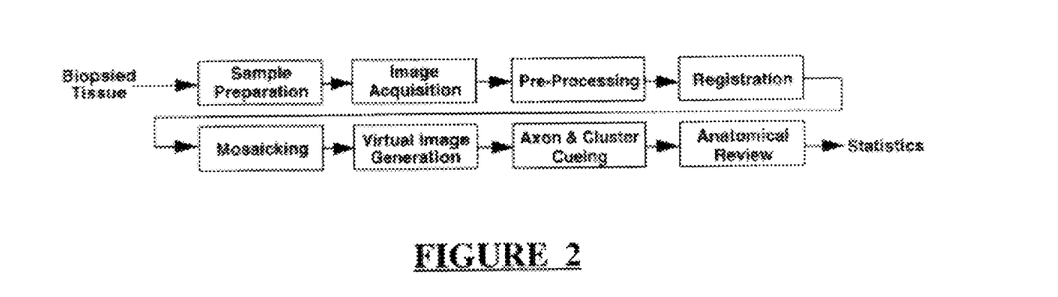
FIG. 2 shows a block diagram of processing stages.

This invention is directed toward a suite of image processing steps used to determine the effect of a particular drug in the treatment of diabetic peripheral neuropathy by examining the effect of the drug on peripheral nerve tissue using electron microscopy (EM). Broadly, the invention makes it possible to capture images at high magnification, mosaic them into a single, very large composite, and then provides tools to aid neuroanatomists in reviewing this volume of imagery. The following sections describe each of the processing stages for a given sample, from the time the nerve biopsy was taken, through the image acquisition and processing steps, until the statistics based on the review by a neuroanatomist were collected (see FIG. 2).

When the nerve biopsy is taken, there are a number of sample preparations steps that occur, prior to the time that the sample is imaged. Following this preparation, the sample was automatically imaged on the electron microscope, and the data files were transferred to another computer for pre-processing, registration, and mosaicking. When the composite, or "virtual" image product was complete, the data was transferred to a third computer station where automatic axon and cluster cueing was carried out. The outputs from this process, along with the composite image data, were then sent to a sample reviewing station, where a neuroanatomist reader would examine the sample, and mark axons and regenerative clusters. These marks formed the basis of the statistics that were analyzed to evaluate the efficacy of the drug.

The samples for the study were obtained from sural nerve biopsies taken from different legs, before and after a 1-year treatment period. The sample tissue was fixed and embedded in a plastic material at the site of the biopsy, after which the samples were divided into blocks, and a single fascicle was chosen as being the most acceptable for electron microscope imaging.

For carrying out the actual image acquisitions, a very specific process was defined for setting the intensity levels, the KeV value, and other parameters of the electron microscope, as well as for setting the position of the sample, setting the focus, and obtaining a background image, all with the purpose of trying to guarantee reasonably consistent imagery over the course of each sample, and over the course of the study as a whole. Once a complete set of raw image frames was collected for a sample, pre-processing operations were performed, both in preparation for the image registration process, as well as to provide the best possible image contrast for later review by the anatomists, and for the automated cueing process.

One of the major difficulties at this stage, however, was caused by the effect of the electron beam on the sample tissue, which created tiling and other visual artifacts. To alleviate such problems, we first averaged together all of the raw image frames for a given sample to get a "mean" image that would take into account both the phosphor variations in the background, as well as the etching side effects of the beam. We then used this mean image as a revised "background image", and divided it into each frame.

Instead of generating a new 8-bit frame immediately, however, we saved the floating point division values into a high-precision "floating-point histogram" (retaining fractional values down to 0.001), for subsequent analysis. This floating-point histogram, collected over all of the frames for the sample (over 1 gigapixel), allowed us to ignore regions where no tissue was present (i.e., with a ratio >=1.0), and to find the upper and lower 0.5 percentiles of the remaining points. These percentiles would be used for contrast stretching the data to 0–255 on the output. To carry out this operation, we prepared a 256×256 entry, 8-bit output look-up table, so that we could map each pair of incoming frame and mean image pixel values ("FrameVal" and "MeanVal", below) to the desired 8-bit value ("OutVal"), using the following formula:

$$\text{OutVal} = \text{MAX}[0, \text{MIN}[255, \text{ROUND}[((\text{FrameVal}/\text{MeanVal}) - F0.5) / (F95.5 - F0.5) * 255.0]]] \quad (1)$$

FrameVal and MeanVal vary independently over 0 to 255, and F95.5 and F0.5 are the values corresponding to the upper and lower percentile bounds, respectively. Using this lookup table, we could quickly remap all of the original image frames to their desired 8-bit, contrast-stretched values, without the loss of precision that would have occurred had we separately performed the division into 8-bit images, and then clipped and contrast-stretched the results, again into 8-bits. With the approach described, we retained all of the precision that we possibly could in producing the 8-bit processed image frames, which then formed the basis for all of the steps that followed.

After pre-processing each frame for a single sample, the next step was to register all of these frames together. For any given pair of adjacent images, we needed to search a space of more than 200 by 200, or 40,000 potential offsets. Because it would have been time-prohibitive to actually test every possible offset, we developed a 2-stage approach, first obtaining a reasonable search area or starting point with low-resolution data, then performing a full-resolution tree-search to find the precise match position. This strategy kept the number of computations required to register each pair of images to a reasonable level, something closer to a few hundred tests per image pair. The same registration process was used both for matching images in the horizontal direction, as well as the vertical (though we did not register all vertical pairs).

In the first stage of image pair registration, we selected equal-sized subsections from each image and downsampled them by a factor of 8 in each direction. These subimages were both binarized by thresholding at their median levels (50th percentile), under the assumption that this should turn on roughly corresponding sets of pixels in both images, and provide maximum matching accuracy in an information-theoretic sense. Next, a full binary correlation was performed over these small chips; that is, we computed the value of: (#11+#00)/(#11+#10+#01+#00) over all legitimate translations. Counts were taken only over the portions of the two chips which overlapped, in each case. The peak correlation was used as the starting point for the more elaborate full-resolution search described below. This downsampled binary correlation rarely failed except in very pathological cases, and even when it did not find the "best" location, it was usually close enough for the search algorithm to find the correct registration point.

Figure 4:
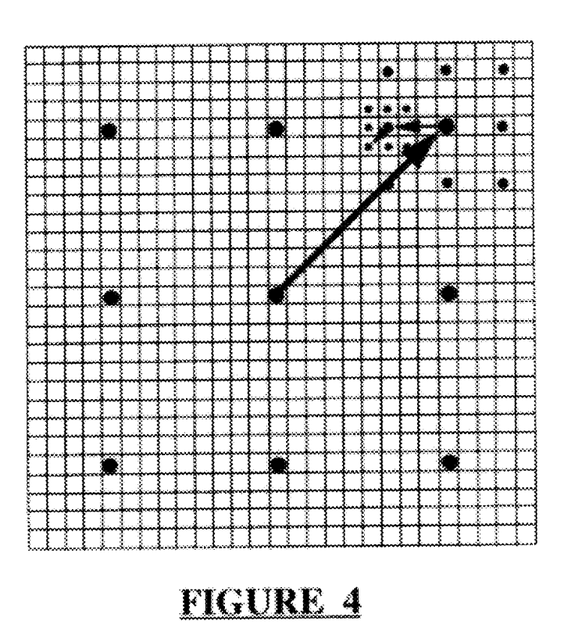
FIG. 4 is a diagram of a tree-search registration algorithm.

Given the nominal search starting point found by the low resolution algorithm, we then began a hierarchical, or "spiraling" tree search, at full resolution (see FIG. 4). The starting point was scaled up to full-resolution coordinates. We cut out equal-sized subimages from each image that would fully cover the search region, and these subimages were also binarized by thresholding at their medians. The sub-images were then filtered morphologically to remove fine structures, so that the registration could be based on more reliable, larger structures.

The principle of the search process was as follows. At a given stage, we would compute a score for the current best point, as well as for 8 other points at equal chessboard distances (45 degree increments) away. The point with the best score would then be chosen as the new center, and the same process would be repeated, but with the distances to the 8 other points cut by half. After several rounds, the search process would be complete, and the resulting center point would be returned as the registration match point. To bias the scoring toward matching of the darker structured regions, we computed a score of: (#11)/(#11+#10), for each translation, instead of the usual binary correlation score (again, only over the overlapping portions of the subimages). In most cases, this search strategy quickly zeroed-in on the desired match point.

While the above approach was used to register each successive pair of adjacent frames in a row, for registering between rows we adopted a slightly different approach. In principle, if all of the frames in a single row have already been registered, they are, in a sense, "locked" together, so that to register two successive rows, we should simply have to find a single reliable correspondence between them, and then shift all the frames accordingly. In practice, the horizontal registration process was not 100% reliable, and so to guard against these types of errors, we performed pair-wise registration in the vertical direction between the 7 central frames in each row, and then used the best match score among these seven to register the successive rows. This almost never failed to reasonably match the rows, even when serious errors had occurred in the horizontal, or pair-wise, registration process.

Figure 5:
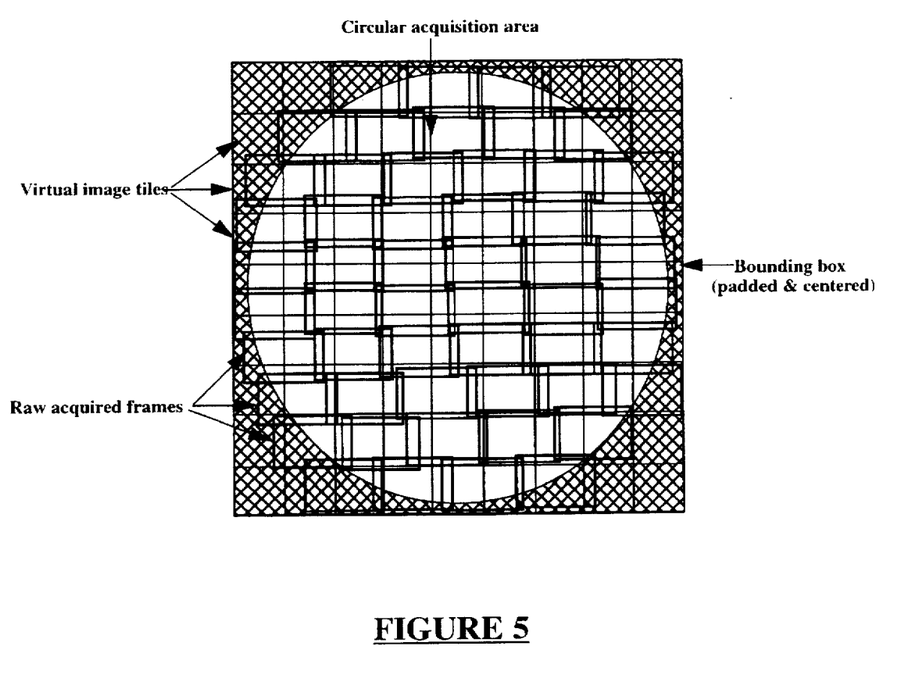
FIG. 5 is a schematic of a mosaicking process.

When the pair-wise and row-wise registration steps were complete, the next stage in the overall process was to mosaic the raw frames together into a composite "virtual image," where all of the image tiles would be adjacent but non-overlapping, and of a convenient, fixed size. There were two parts to the actual mosaicking process: first, to put all of the locations and relationships of the registered raw frames into a single, global address space, and then, to use this information to define adjacent but disjoint tiles that were each 1K by 1K in size (See FIG. 5).

To perform the global address resolution process, a tree structure was created with all of the rows of the acquired image frames at the top level, and all of the images within each row as ordered children of that row. This structure was used to retain the coordinates of the upper left corner of each acquired frame, with respect to progressively larger objects, through several "rounds" of address resolution. First, during pair-wise registration, the coordinates for each frame represented the position of its upper-left corner with respect to that of the image to the immediate left. In the next pass, upper-left coordinates of each frame in a row were recomputed with respect to that of the leftmost frame in that row. During row registration, as the relationship between each successive row was determined, the upper-left coordinates of the frames below the first row were all updated to reflect the position of the frame with respect to the top-left frame of the first row (i.e., the entire acquisition sequence). At this point, the position of all of the frames was known with respect to the same origin.

The remaining steps before generating the virtual image mosaic were to find the bounding box of all of the frames, and then pad this box to multiples of 1024 pixels, at the same time centering the image data within this area. The bounding box was easily obtained, based on the fixed size of the frames (1024 rows by 1500 columns), and their known relationship to the top-left frame origin. A new origin was then computed as the top-left corner of the bounding box. Next, the size of the bounding box was padded out to the next whole multiple of 1024 pixels in each direction, to make it easy to cut out the 1K by 1K tiles. This larger box was then shifted up and left to center the circular image data within it, and finally the coordinates of every frame were updated with respect to the origin of this padded and centered bounding box. The resulting tree data structure with these final coordinates was then saved, as the permanent record of the relationship between the raw acquired EM frames, and the processed virtual image composite tiles.

To produce the individual tiles of the composite virtual image, we next had to find all of the raw frames which intersected a given tile, and determine which subimage portions of these images were involved. For a given tile, (including bordering tiles with no image content), anywhere from 0 to 9 image frames might intersect. Since we only considered translations between frames in the registration process, the intersections were all rectangles of different sizes. In some areas, of course, 2 or 3 images might overlap the same tile area, so we had to decide how to resolve such conflicts. While we had initially contemplated averaging such areas together, initial experiments showed that this approach produced very blurred, complicated images in cases where registration had not precisely matched the subregions.

To avoid this effect, and to produce more comprehensible images, we elected instead to overwrite each subarea based on the raster order of the corresponding frames. This gives priority to the lower-right frames, a somewhat arbitrary but consistent choice. The advantage of this approach is that, while it leads to discontinuities in the images when registration is imperfect, at least the result is more understandable and less confusing to a reader, than the blurred melanges created through averaging. Often the reader could figure out what had happened visually, and thus could still correctly evaluate the area of the image where the misregistration had occurred—something that was important for getting accurate statistical results.

Figure 6A:
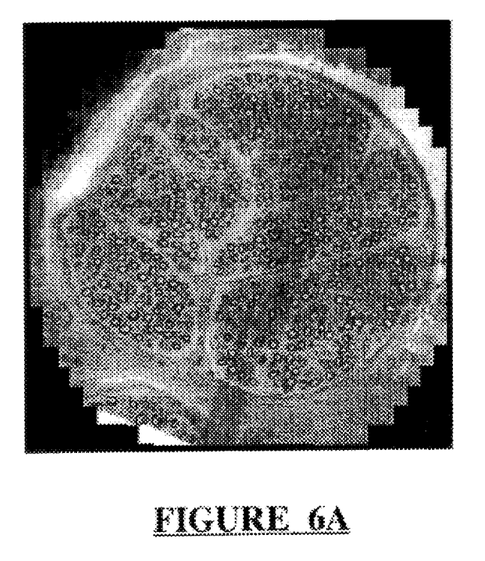
FIG. 6A is a composite of a lo-res image.
Figure 6B:
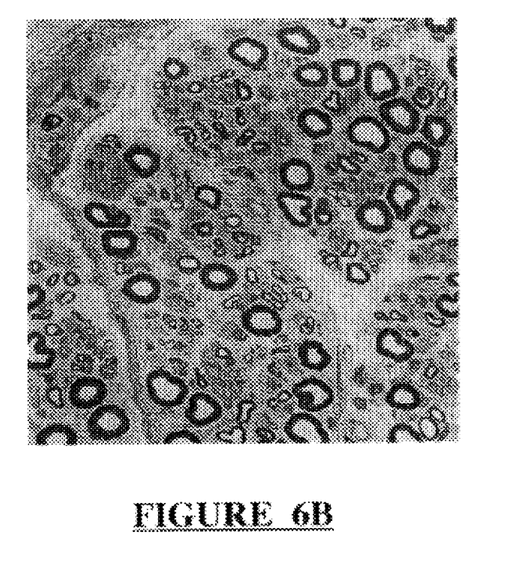
FIG. 6B is a composite of a 4× magnified subregion.

The final step in virtual image generation was to generate what we called the low-resolution, or "lo-res" image. This was a single composite image, formed by downsample-averaging each virtual image tile by 8 in both directions. Specifically, each 8 by 8 block of pixels was replaced with a single average value, and then all of these reduced image chips were placed into a single image frame, which typically varied in size from 10 to 40 megabytes (roughly 4–7 feet in diameter at 72 dpi screen resolution). This lo-res image was used both by the cueing algorithms for finding axons and potential clusters, and by the neuroanatomist readers for verifying cues, making additional marks, or noting potential cluster sites or other locations that needed to be reviewed at high resolution. FIG. 6 illustrates an example of such a lo-res composite image (greatly reduced), and a 4× magnified portion of it that better illustrates the resolution used for finding and marking axons. The latter image gives an idea of the distribution of sizes and shapes of different axons and their surrounding myelin sheaths, within a single fascicle.

Figure 7:
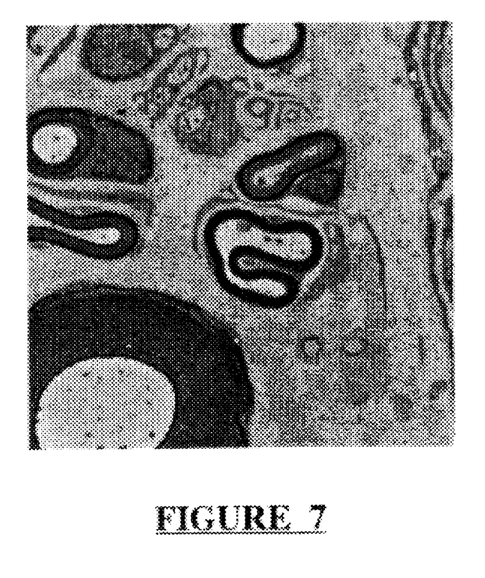
FIG. 7 is a full-resolution tile showing possible cluster.

In FIG. 7, we have taken a small portion from FIG. 6b, and magnified it 8 times. This image represents the full-resolution data that we have available for any part of the composite virtual image. In fact, FIG. 7 is actually a single virtual image tile (1K by 1K), which would normally fill a computer screen. In this image we see both large and small axon fibers, along with a potential cluster (in the middle), and a couple of Schwann cells (with textured interiors) toward the upper left. Note that the Schwann cell along the top left of the image is about the same size as the small axon fiber to its right. In light microscopy (LM) of this kind of nerve tissue, it can be very difficult to distinguish such Schwann cells from axons, based on the stains that are typically used, so they have been a major source of false alarms in counting small axons using light microscopy.

The grey texture that appears in the background of FIG. 7 are collagen fibers, which can actually be seen individually, at full screen magnification. In this image, it can also be seen that the myelin-surround of the axon fibers varies in darkness or stain absorption, something that the axon cueing process should account for.

The pair of small axons shown in the center of this image are not surrounded by a basement membrane, and thus do not represent a true cluster. However, to understand the size of the membranes and the difficulty of verifying them, consider the indented axon near the middle of the image. If we look at the lighter grey structures that sit within the outer concavities of the myelin of this fiber, we can barely see very thin membranes along their outer edges. These membranes are about the same width as a basement membrane that would have to surround both of these center axons, in order for them to be considered as a cluster.

Figure 3:
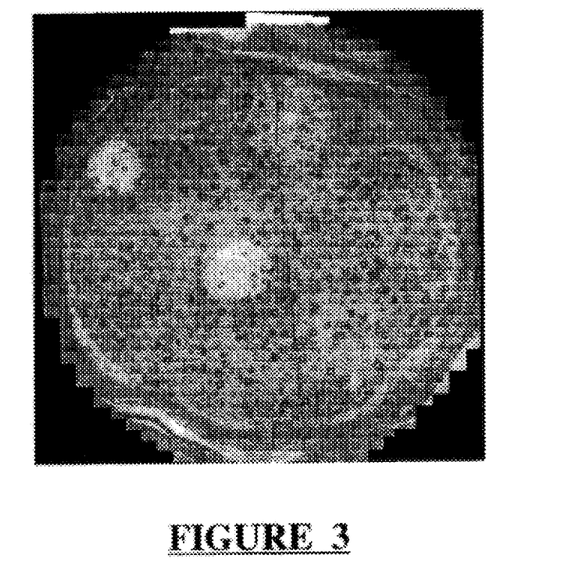
FIG. 3 illustrates a composite of tiling effects of electron beam.

The next stage of processing in the overall system is directed toward axon and cluster cueing. The process of axon cueing had to be able to cope with artifacts of the type visible in FIGS. 1, 3, and 6, and still perform well at finding most of the axons, without generating very many false alarms. The simpler methods of segmenting such images, such as global fixed or adaptive thresholding, or background normalization followed by fixed thresholding, all gave very poor results. Clearly a local approach was necessary, but one that could adapt to the characteristics of each sample, and which could also handle the factor of 20 difference in scale between the largest and smallest axons.

The approach finally taken for axon cueing was based on the observation that in terms of the grey level "topography", the light axon interior rises like a tower or castle above the dark, lower myelin "moat" which completely surrounds it, no matter what its shape. Moreover, at the lowest levels of the myelin, there are almost no other structures present, making it relatively easy to perform a clean opening that will extract the axon interiors fairly precisely.

Figure 8:
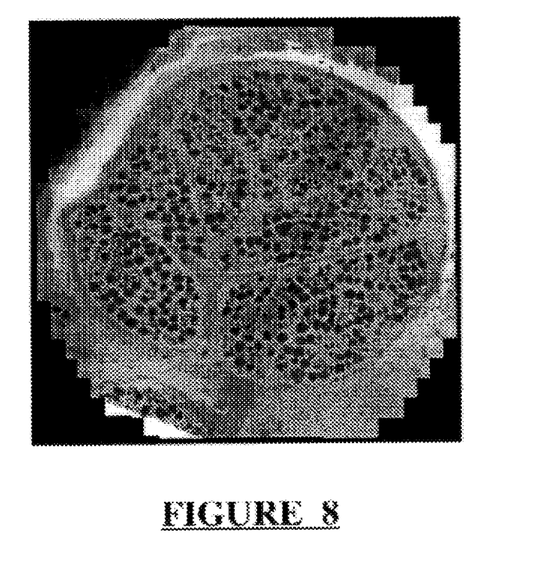
FIG. 8 shows a grey-level opening and condition dilation of an image.

Since axons come in many different sizes, so as to avoid performing multiple, size-specific operations, we performed an opening by a hexagonal element that was wider than any axon (radius 32, or around 5 microns), and then used a grey-level conditional dilation (or "numerical reconstruction") operator to recover regions of the background that were lost by the opening, but still connected to larger background regions that had not been removed. This works well for these images because the axon fibers are never directly adjacent—there is always some space between them. This technique provided a very good background estimate for extracting the axons (see FIG. 8). In fact, the resulting difference with the original, or opening residue, looked almost like a binary image, and was very easy to threshold using an automatic method based on the minimum sum of variances.

Next, to obtain an estimate of the complete fibers, including the myelin, we used the same concept but in the opposite sense. We took the image shown in FIG. 8, and performed an even larger closing (radius 64, or about 10 microns), to close up the "pits" where the axons had been removed. To allow for the different fiber sizes we used a size larger than any fiber, and then used grey-level conditional erosion ("dual reconstruction") to reclaim regions of the foreground that would have been covered over by the closing, but which were connected to larger regions that were not. This gave an excellent foreground estimate for extracting the filled-in "pits", representing the fiber areas. This difference or closing residue was then automatically thresholded using the same minimum sum of variances criterion used earlier.

Figure 9:
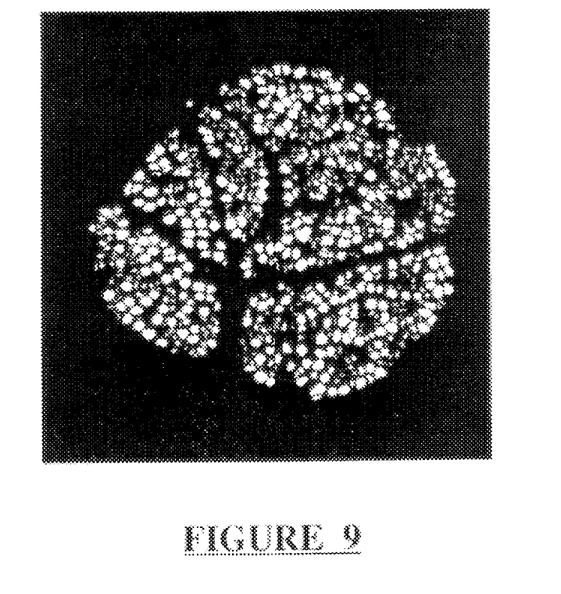
FIG. 9 illustrates a final result of an axon cueing algorithm.

We now had two binary images, one representing the possible axons, and the other representing the possible fibers. By cleaning some of the noise and linear structures from these images, and then conditionally dilating the axons estimate over the fiber estimate to enforce the co-occurrence condition, we arrived at our best estimate of the true fibers in the image. Additional steps were performed to remove fibers too close to the outer border of the image, which were axons from adjacent fascicles. The result for the fascicle seen in FIG. 6 is shown in FIG. 9. The final steps were to label these fibers and calculate their centroids. These were later used as the cue points or marks for the neuroanatomist reviewing step.

Figure 10:
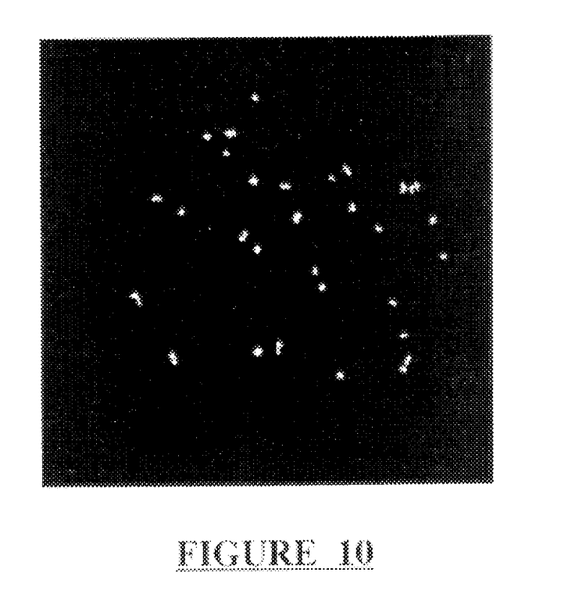
FIG. 10 illustrates a final result of a cluster cueing algorithm.

Given the fiber image result shown in FIG. 9, and the binary image of the axon interiors of these fibers, the job of the cluster cueing algorithm was to find groups of small axons which could potentially be considered as clusters. This was done based on three criteria: width of myelin, proximity of fibers, and the shape factor of the groups. First, we removed any fibers whose myelin (fiber minus axon) contained a radius 5 hexagon, as being too large or old to be of interest. Then we took the remaining fibers, dilated them by a hexagon of radius 3, and retained any groups that formed, eliminating singletons. Finally, we measured the shape factor of the remaining groups, and removed any whose shape factor was greater than 3.0. This latter step was carried out because observations of actual clusters showed that typically they form rounded or slightly elliptical groups. The shape factor (perimeter/$4\pi$*area), equals 1.0 for a perfect disk and extends to infinity for a line. Thus, a cutoff of 3.0 represents groups that are still fairly round. The result of this algorithm, again for the image in FIG. 6, is illustrated in FIG. 10.

In terms of axon cueing, we found that the method was successful at identifying about 95% of the axons correctly, with only a 1–2% false alarm rate. Of the errors, around half were caused by registration errors which should have been corrected earlier, so that the algorithm actually got about 97–98% of the axons that it was expected to get. Other errors were caused by staining anomalies, locally light myelin, or other artifacts which caused breaks in the axons. The axon cues' presence did not appear to bias the reader's responses.

For the cluster cueing, the results were not quite as good, but still encouraging. Only 50–60% of the potential clusters marked by the readers were found by the method, but since clusters tend to occur in groups, in terms of directing the readers' attention to high-likelihood areas, the method probably covered about 70–80% of the desired regions in the images.

That claimed is:

1. An automated mosaic construction process and review method for electron micrograph composite images, comprising the steps of:

imaging a nerve cross-section at high magnification to obtain a plurality of high-resolution images arranged as multiple frames within multiple rows;

registering the frames within each row and between rows;

mosaicking the frames into a single, large composite image; and performing one or more morphological operations to assist in estimating the number of axons, clusters, and fibers within the composite image.

2. The method of claim 1, wherein the step of performing one or more morphological operations to assist in estimating the number of axons within the composite image further includes the steps of:

performing an opening operation on the composite image using a structural element which is wider than the width of any axon; then performing a grey-level conditional dilation to recover regions of the background that were lost by the opening, but still connected to larger background regions that had not been removed.

3. The method of claim 1, wherein the step of performing one or more morphological operations to assist in estimating the number of fibers within the composite image further includes the steps of:

performing a closing operation on the composite image using a structural element larger than the width of any fiber; then performing a grey-level conditional erosion; and automatically thresholding the result.

4. The method of claim 1, wherein the step of performing one or more morphological operations to assist in estimating the number of fibers within the composite image further includes the step of:

conditionally dilating the axons estimate over the fiber estimate, and eliminating fiber groups along the image border.

5. The method of claim 1, wherein the step of registering the frames further includes the steps of:

averaging the frames to obtain a mean image;

dividing the mean image into each frame; and analyzing the resulting floating point image histogram to determine the ideal contrast enhancement.

6. The method of claim 1, wherein the step of registering the frames within each row further includes the steps of:

examining potential offsets associated with adjacent frames in a row for the best correspondence.

7. The method of claim 6, wherein the step of examining potential offsets associated with adjacent frames in a row further includes the steps of:

obtaining a reasonable search starting point with low-resolution data; and performing a full-resolution tree-search to find a precise match position between frames.

8. The method of claim 7, wherein the step of obtaining a reasonable search starting point with low-resolution data further includes the steps of:

selecting equal-sized subsections from each image;

downsampling the subsections by a predetermined factor;

binarizing the subimages by thresholding at their median levels; and performing a full binary correlation was performed over these small chips.

9. The method of claim 7, wherein the step of performing a full-resolution tree-search to find a precise match position between frames further includes the steps of:

performing a hierarchical, or "spiraling" tree search;

extracting equal-sized subimages from each image that would fully cover the search region;

binarizing the subimages through median thresholding; and morphologically filtering the sub-images to remove fine structures.

10. The method of claim 1, wherein the step of registering the frames between rows further includes the steps of:

determining a correspondence factor between rows; and shifting all of the frames within a row to be registered in accordance with the correspondence factor.

11. The method of claim 1, wherein the step of mosaicking the frames further includes the steps of generating image tiles which are adjacent but non-overlapping, and of a convenient, fixed size; and generating a single, low-resolution image by downsample-averaging each virtual image tile in both directions.

* * * * *

UNITED STATES PATENT AND TRADEMARK OFFICE
CERTIFICATE OF CORRECTION

PATENT NO. : 5,796,861
DATED : August 18, 1998
INVENTOR(S) : Vogt et al

It is certified that error appears in the above-indentified patent and that said Letters Patent is hereby corrected as shown below:

On the title page,
item [73] Assignee: "Frim International, Inc." should be "ERIM International, Inc."

Signed and Sealed this

Twenty-seventh Day of March, 2001

Attest:

NICHOLAS P. GODICI

*Attesting Officer*

*Acting Director of the United States Patent and Trademark Office*